Inventors
E.P.G. Wright
J.C. Emerson
By [signature]
Agent

Nov. 17, 1964 E. P. G. WRIGHT ETAL 3,157,744

SYSTEM FOR COORDINATING A PLURALITY OF SYNCHRONIZED TIME DIVISION MULTIPLEX SYSTEMS

Filed June 7, 1960 3 Sheets-Sheet 2

Inventor
E.P.G. Wright
J.C. Emerson
By [signature]
Agent

*Inventor*
E.P.G. Wright
J.C. Emerson
By [signature]
Agent

United States Patent Office 3,157,744
Patented Nov. 17, 1964

3,157,744

SYSTEM FOR COORDINATING A PLURALITY OF SYNCHRONIZED TIME DIVISION MULTIPLEX SYSTEMS

Esmond Philip Goodwin Wright and John Christopher Emerson, London, England, assignors to International Standard Electric Corporation, New York, N.Y., a corporation of New York Filed June 7, 1960, Ser. No. 34,452
11 Claims. (Cl. 179—15)

This invention relates to information processing system such as telecommunication exchange systems, in which information is processed by electronic equipment operating on a time division multiplex basis.

Such systems are of two types, in the first of which the actual paths via which communications occur are on a time division multiplex basis, and in the second of which the actual communication paths are not on a time division multiplex basis.

In a relatively large system of either of these two types, there may be more than one multiplex highway, each such highway being associated with a number of the user circuits between which connections may be set up and having control equipment associated with it. Since these control equipments need to be able to co-operate one with another, further control equipment common to the whole system is required.

According to the invention, an information processing system is provided which includes a plurality of time division multiplex (T.D.M.) systems each of which serves a group of user circuits between which connections are to be established, in which each said T.D.M. system includes control equipment and storage locations, hereinafter referred to as a "slave memory" for storing information relating to connections to be set up to circuits served by its T.D.M. system and which are scanned in turn according to a prearranged scanning cycle, and means common to all said T.D.M. systems for detecting an error in the process of inserting information into, or withdrawing information from, said slave memory.

Also according to the invention a telecommunication exchange system is provided which comprises a plurality of time division multiplex systems each of which enables connections to be established between a first set of lines or junctions (user circuits) and a second set of lines or junctions (user circuits), said time division multiplex systems being synchronized with each other and each including a slave memory having a plurality of groups of storage devices, one group for each channel of the time division multiplex system, each said slave memory also including reading and recording means for reading and recording in the groups of storage devices information relating to connections between lines or junctions, each slave memory reading and recording means being arranged to scan the groups of storage devices cyclically at the frequency of the multiplex systems, and control equipment common to all said time division multiplex systems and including a master memory device having a plurality of groups of storage devices, said master memory including reading and recording means for reading and recording into the storage devices in the master memory device information relating to connections set up by said time division multiplex systems, the master memory reading and recording means being arranged to scan cyclically the groups of storage devices in the master memory in synchronism with said time division multiplex systems, but at a frequency which is a submultiple of the frequency of the time division multiplex systems.

The advantages resulting from the use of a different rate for the individual and common control circuits in the performance of circuit operations will be apparent from the ensuing description.

The invention also describes means which are incorporated having the function to ensure high reliability in the sense that isolated component faults are prevented from interfering with the stability of the system operation as a whole. In order to ensure that such isolated faults are rendered inoffensive, error detecting facilities are included which enable a faulty circuit to be identified and replaced automatically by an auxiliary circuit.

For high reliability this system design depends on the assumption that the component performance is sufficiently good to assure that there will be a reasonable interval between faults and that such faults as are detected can be cleared by manual replacement in the interval before a second fault occurs in the same group.

The error detecting and indicating is achieved by redundant apparatus but in such a way that the amount of redundant apparatus is sensibly less than would be required with duplication.

The invention will now be described with reference to the accompanying drawings in its relation to an electronic telecommunication exchange system, but it will be clear that the invention is equally applicable to other forms of information processing systems, and in the accompanying drawings:

FIG. 2 shows schematically circuits whereby faults can be dealt with; and

Figure 1:
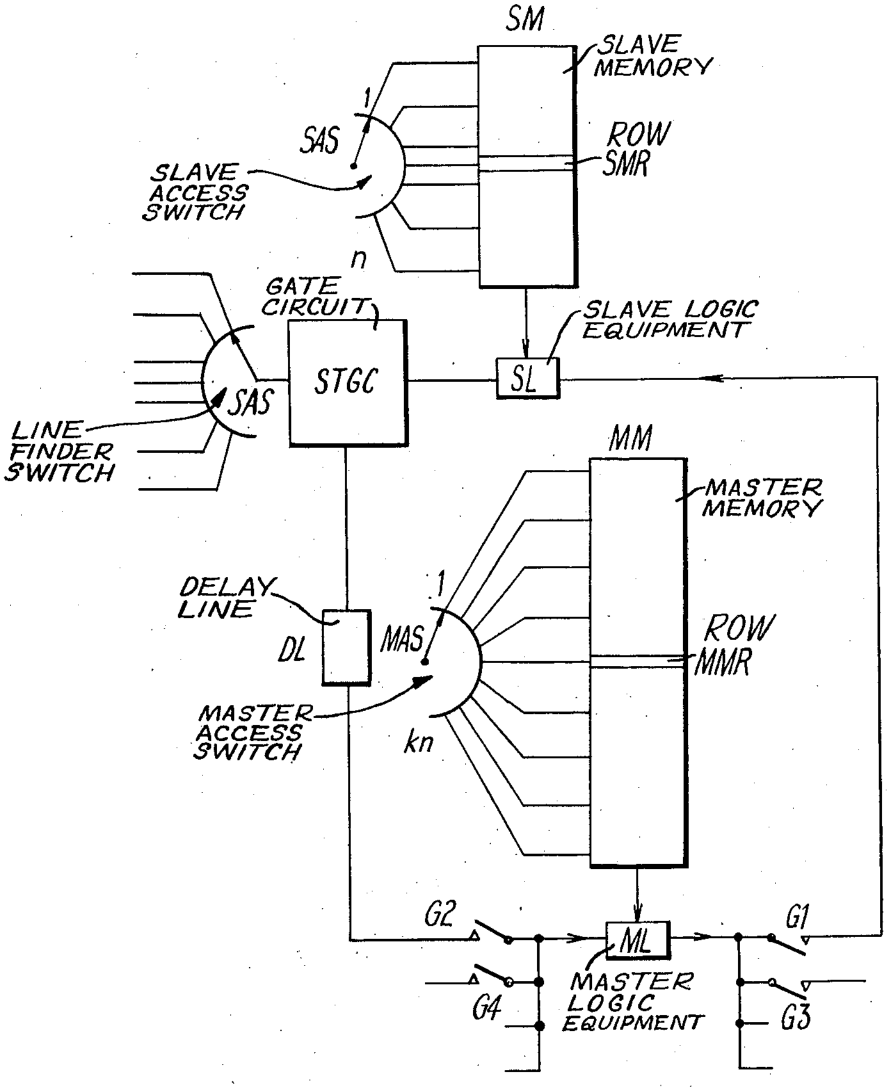
FIG. 1 is a block schematic of as much of the control circuit of a telecommunication exchange as is necessary for the understanding of the present invention.

Before considering the drawings, a brief general description will be given. In the first, and probably more important, of the two types of system referred to in the opening paragraphs, the actual communication connections are set up over time division multiplex channels. When one multiplex system is inadequate to handle the traffic expected, the subscriber's lines and junctions are subdivided into two or more groups, each of which is served by a time division multiplex system.

United States Patent No. 2,910,540, issued October 27, 1959, to S. Van Mierlo et al. describes such a system in which the multiplex systems serving the groups are identical, and in which a connection between two lines is established over corresponding channels in the multiplex systems serving the calling line and the wanted line. Hence, in effect, the two lines are directly connected at the same time position in the multiplex cycles over the highways of the two multiplex systems involved.

In other systems, a connection does not necessarily use corresponding channels in the multiplex systems serving the calling line and the wanted line. However, in such systems it is necessary to transfer the modulation between the time division channel allocated to one of the lines involved in a connection and the channel allocated to the other of the lines involved in that connection. This may be effected by the use of the "speech storage" technique described in our patent specification now British Patent No. 822,297, issued February 10, 1960, or as in certain known system by the use of a link circuit wherein speech or signals are demodulated from the channel allocated to one line and remodulated onto the channel allocated to the other line.

The second type of system mentioned in the opening paragraphs is one in which, although communication connections are set up over channels which are physically separate in space, i.e. on what has been termed a space division basis, the control equipment which causes these connections to be set up functions on a time division basis. Here also it may be necessary to have several multiplex systems each serving a different group of lines and/or junctions outgoing from the exchange.

Thus in all of these systems there are a number of time division multiplex systems each serving a group of lines and/or junctions (user circuits). Each system's control equipment includes a memory referred to herein as a slave memory which has a compartment for each time division channel of its multiplex system. When a channel is to be used, information relating to the connection for which it is in use and inserted in that channel's compartment of the appropriate slave memory. The common control equipment for the whole exchange includes a further memory referred to herein as a master memory, which has a number of compartments equal to the sum of the numbers of channels provided by all of the multiplex systems.

At the time position forming a multiplex channel, the information recorded in that channel's compartment of the appropriate slave memory is read therefrom, and used in a manner dictated by the nature of the system. Thus in a system in which communication connections are over time division channels it causes one of the lines or junctions involved in a connection to be connected to the highway of its multiplex system, and that highway to be given access to the highway of the multiplex system serving the other line involved in the connection. The information is then replaced in the slave memory, either altered or unaltered as required. Hence the rate at which access is obtained to information in a slave memory is conditioned by the speech or information sampling rate. This is usually of the order of 10 kilocycles per second in the case of speech.

The master memory having a larger number of compartments to scan, effectively has a slower cycling rate than does a slave memory, i.e. the rate at which its associated circuits have access to the compartments thereof is slower than the rate at which the circuits associated with the slave memories have access to their compartments. In the system to be described in more detail later, the master memory is scanned at rate which is only one quarter of the scanning rate of the same slave memory. During these cycles the common equipment functions for the control and/or supervision of connections for the lines and/or junctions served by that slave memory and its multiplex system. The functions so performed include the determination as to whether a line or junction is calling or quiescent, the determination when a connection has been finished with, such translations as are needed during call settling, and in many cases the marking of the wanted subscriber's line (or a junction ultimately giving access thereto).

Where the actual communication paths are on a space division basis, the rate at which the compartments of the slave memories are selected is dependent on the nature of the space division communication paths, but is, in general, slower than where time division paths are used. However, the master memory is still in operative association with the slave memories one at a time.

The drawings mentioned above show as much as is necessary for the purpose of the present specification of the control equipment of an exchange in which communication connections are set up via time division multiplex channels, and using the principles described in our above-mentioned patent. They do not show the actual highways of the multiplex systems.

Considering first the block schematic of FIG. 1, MM represents the master memory, which is a co-ordinate matrix of ferrite storage elements, each of the $kn$ rows of which forms one compartment of the master memory. One of these rows is indicated at MMR. Each of these rows is associated with one of the channels of one of the exchange's multiplex systems. There are $k$ such systems, each providing $n$ channels. The master memory MM is controlled by the master access switch MAS, which although represented symbolically as a rotary switch, is a co-ordinate matrix of ferromagnetic elements. Each element of the access switch MAS is associated with one row of the master memory MM, and the switch is so controlled by electronic pulse distribution circuits of well-known type as to select its elements one by one in a predetermined order. The selection of an element of the access switch MAS causes the information to be read from the corresponding row of MM, after which, any processing thereof which is needed occurs and the information is re-written into the row. MAS then selects the next row whose information is to be read.

SM is the slave memory serving one of the multiplex systems, and is similar to, but smaller than MM, since it only has as many rows, i.e. compartments, as there are channels provided by its multiplex system. SMR represents one of the rows of elements of this memory, and SAS is the access switch of SM. This is similar to, but smaller than, the master access switch MAS. It selects the rows of SM singly and successively, each row being selected 10,000 times per second since that is the rate of speech sampling used.

Block ML, associated with the main memory MM, is the common logic equipment, and SL is the logic equipment associated with the slave memory SM. Between them, these circuits receive the results of the examination of the information in the respective rows of the memories MM and SM, and also such ancillary information as is necessary, and process this information so as to produce an output dependent on the input condition.

The block STGC represents a gate circuit such as interconnects a subscriber's line or junction and the multiplex highway, which gate circuit receives the output from the slave logic SL and uses this output to connect that line or junction to the highway at the appropriate time position. STGC can also pass a signal which indicates whether the line or junction is calling or quiescent. This signal can reach ML via a gate G2, as will be described later. STGC is shown as having a line finder switch also operating at the speed of SAS, for connecting in turn to the calling lines or junctions.

It has already been mentioned that the master memory MM is associated with a number of slave memories such as SM. The number of rows of the master memory MM is equal to the product of the number of rows in a slave memory such as SM and the number of slave memories served by the master memory. Each row of the master memory is associated in turn with the master memory logic equipment ML, and during this association the corresponding slave memory row is associated with its own logic equipment such as SL. This latter association, however, is much shorter than the former, but it is sufficient to allow signals to pass from ML to SL by means of a gate such as G1. Such a gate is needed for each slave logic SL, another such gate, G3, being shown in FIG. 1. Corresponding gates such as G2, G4, etc., are used to allow supervisory signals to pass from the circuits such as STGC to ML and also signals from SL to ML: such signals must pass during the association of the appropriate row of MM with ML, but not necessarily during the association of the corresponding slave memory row with its slave logic.

It is now necessary to explain the time relationship between the master and slave cycles. The exchange includes $k$ highways (such as that served by SL) each of which can carry up to $n$ time division channels, and the rate at which the master access switch MAS steps is, in the example described, $f$ times slower than the stepping rate of the slave access switch. The integer $f$ must be prime to the number $n$ of channels, i.e. to the number of steps in a slave cycle. As an example, there are 20 highways each providing 25 channels, i.e. $k=20$ and $n=25$, and $f$ is chosen to be 4.

The master access switch therefore remains at each of its "positions" throughout four channel times.

The sequence in which the rows of the main memory MM are selected by the master access switch MAS is such that the various slave logic circuits are in association with the main logic ML in turn. Thus the sequence is such that the main memory rows are selected in such a way that the slave memory rows are associated with the main logic in the following sequence:

SM1/1; SM2/5; SM3/9; SM4/13 . . . and so on

SM1/1, of course, means row 1 of the slave memory SM1, served by slave logic SL1. Obviously each row of the main memory is selected at the time appropriate to the selection of the corresponding row of a slave memory.

Figure 3:
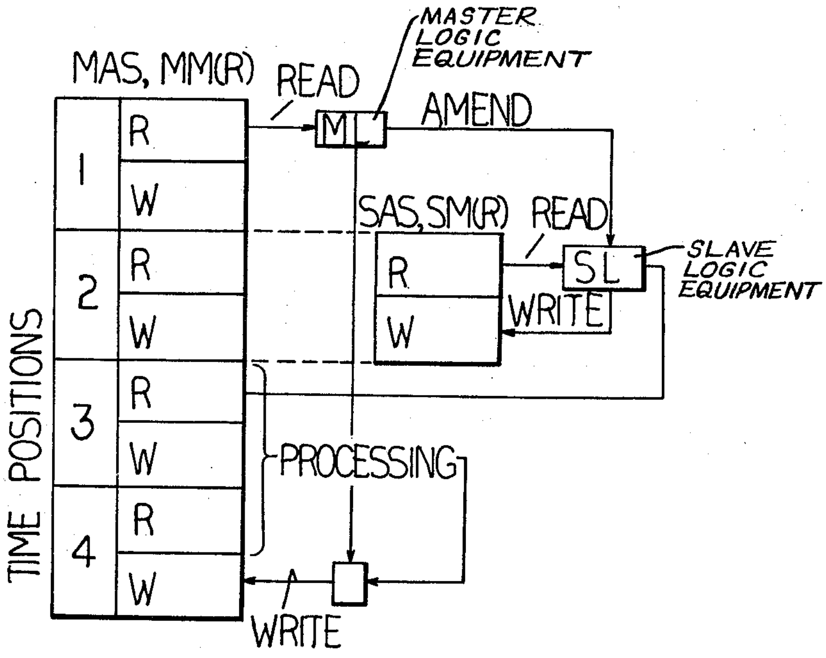
FIG. 3 is a timing diagram.

As regards the four time positions for which the main access switch MAS remains at a single "position" corresponding to one row of MM, these should be centered around the read/write time positions of the corresponding slave memory row. This is illustrated in FIG. 3, which shows the timing relationship diagrammatically, and indicates the basic MAS timing position as divided into four sub-positions, each consisting of a reading position and a writing position. SAS is seen to have a single position comprising reading and writing positions corresponding to the second sub-position of MAS. Thus on the first time position the row of MM is read: the information so transferred into ML determines whether any change is to be made in the corresponding SM row. Hence during the second time position information is sent from ML to the corresponding SL, so that any necessary change in the information therein can be effected during the scanning of SM. Information can be transferred as required from SL to ML during the write period of MS, and during the same time or possibly very slightly after this the supervisory signal (if any) should arrive at ML from STGC. All this occurs during the second time position. During the third time position the information in ML is amended if necessary and during the fourth it is re-recorded into MM.

Thus at a certain time the access switch MAS selects the row MMR of the master memory MM, with the result that the information recorded therein is read and is recorded in a temporary store which forms part of ML. This information may include the address in code form of a subscriber's line or junction. During the second time position, gate G2 is opened to admit to ML information from STGC. This information was stored in STGC during a previous scan by SAS and arrives via a delay line DL whose length is such that this information relates to the line or junction for which the row MMR is in use. This indicates the state of that line or junction, i.e. line or junction looped or unlooped.

While the information from MMR is in the temporary store of ML, further auxiliary information can be admitted to ML, such as translation information, and the result of this will be that at some later time either the original information read from MMR, or new or modified information, is re-written into MMR. At the time at which the writing into SMR occurs, gate G1 is opened, and such of the information as is necessary is repeated to the slave logic SL. Although the connection from ML to SL has been shown as a single connection controlled by a gate G1, it would in fact be a number of connections in parallel, each controlled by a gate such as G1, if the information to be passed consists of a number of bits. The above-mentioned information is therefore transmitted from ML to SL via the connection or connections represented by this connection when the gate or groups of gates represented by G1 conducts.

The information which is received at SL in the manner just described is written into the row of SM, which, by synchronisation, has been selected by the access switch SAS. The timings of the access switch SAS, the access switch MAS, and gate G1 are such that this row of SM is row SMR, the row which corresponds to the row MMR which is being dealt with. At the same time as the information received from ML is written into SMR, this information is passed to the gate circuit STGC, via translation circuitry of known type.

When STGC receives information as described above, it causes the appropriate gate circuit to connect the line or junction to the highway for the duration of one channel time, and it also operates a further gate circuit which passes a signal indicative of the condition of the line or junction, which signal reaches ML via gate G2 while the corresponding row of MM is still associated with ML. Hence the received information can be used to amend the information to be re-recorded in MMR, or for checking purposes.

After the access switch SAS has performed a full cycle of *n* steps it again selects row SMR of SM. At this time, however, since the access switch MAS selects rows of MM at a slower rate, there is no selection of the corresponding row of MM. The information in SMR is therefore read therefrom, and this controls the operation of STGC, and is then re-written into SMR. This action by the slave continues until MAS has made its full cycle of *kn* steps and once again selects row MMR. If it is then necessary to write a new address into the row SMR, this is done by causing the signals via G1 to over-ride the signals read from SMR. Hence the new address passes to STGC, and is thereafter repeated on successive cycles of SAS.

Thus, the control equipment includes a common control system which can deal with calls on a "one at a time" basis at a relatively slow speed, while dispersed systems associated with the circuits served—subscriber's lines or junctions—cause the operations of the gates which connect those circuits to the highways of time-division multiplex systems at a relatively high speed. The time channels are defined by the times at which information is written into the rows of the master memory so that if the slave equipment makes an infrequent error, either by its access switch failing to step or by the rows failing to repeat correctly the information identifying a line, such errors are not perpetuated but are corrected on the next master memory cycle. If the addresses are conveyed by an error-indicating code, then if the master memory produces an erroneous code it can be inhibited and the true code received from the slave on the assumption that the latter has functioned corrctly during the previous cycle. Thus occasional errors on the part of the equipment are automatically corrected.

Figure 2:
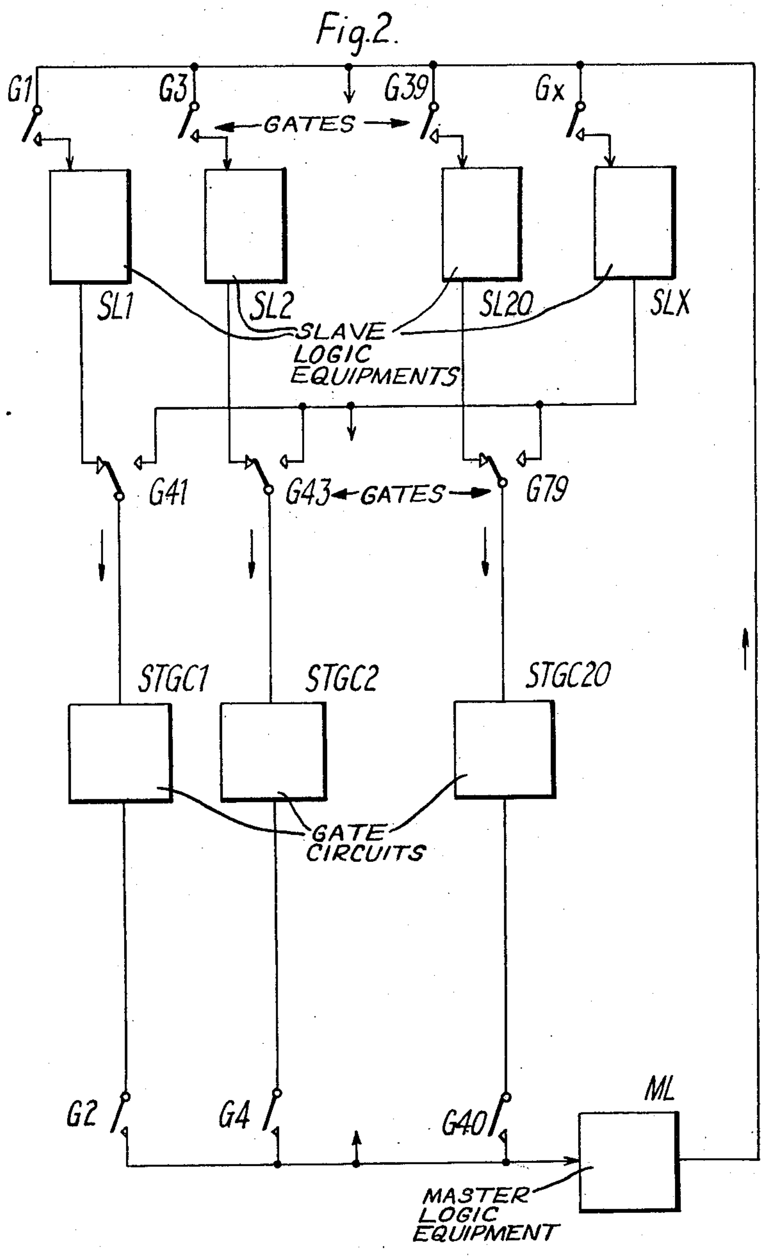

It is now necessary to refer to FIG. 2 in respect of the checking operations mentioned above. This figure shows schematically the master logic ML, slave logic circuits SL1, SL2, . . . SL20, and a standby slave logic circuit SLX. Also shown are three of the STGC circuits, STGC1, STGC2 and STGC20 and the gates between these elements. The slave logic SLX can be so used as to replace any one of the other slave logic circuits such as SL1 should one of those circuits be found to be faulty.

When information is passed from a slave logic circuit such as SL1 via the corresponding gate such as G41, circuit such as STGC1 and gate such as G2 to the master logic ML, this information is compared by ML with the data which was read from the appropriate row of MM. The result of this comparison indicates during call setting or release whether there is any amendment necessary to the contents of MM. In addition, it indicates, especially after a call has been set up, whether any error has occurred. If the error so detected is such as to necessitate a fault correction in a slave logic circuit, then the standby slave logic circuit SLX is switched into circuit. In this case the gates which are represented by G41 (if it is SL1 from which a fault indication has been detected) operate so that SLX is inserted in the circuit. On the next occasion on which SL1 would have been selected, GX conducts so as to select SLX. Hence the information in MM for the memory served by SL1 is transferred successively from the "central records" thereof contained in MM via ML to SLX. Hence as long as SLX is in use, it and its associated slave memory (not shown) take over the functions which were previously performed by SL1 and its associated slave memory.

It will be appreciated that, in order to insert the necessary information into the slave memory of the stand-by logic SLX, it is necessary to modify the control of the main memory access switch MAS so that the appropriate rows of MM can be selected one after the other at the same rate as the slave memory rows are selected. It is necessary to transfer this information in such a way as to minimise the interference with established connections caused by the fault condition. After this rapid transfer has been effected, the normal operation can be resumed. To ensure that a "sub-routine" for the access switch MAS does not upset the normal rate at which the rows of the main memory MM are selected to an unacceptable extent, a short time period can be included in each full cycle of scanning of MM for the insertion of this "sub-routine" when a fault occurs.

A simple alternative to the use of a complete SL plus SM as stand-by equipment would be for each SL plus SM to include its own stand-by equipment which would be switched into use when required under the control of ML.

The identities of the lines or junctions written into the memory rows, of course, correspond to the lines or junctions to which the channels have been temporarily allocated, and the signals which pass between the various parts of the control equipment depend on the state of the connection being set up or in progress.

By selecting main memory rows corresponding to rows of different slave memories sequentially in the manner described above. i.e. SM1/1; SM2/5; and so on, the period between a fault developing and the fault being found is substantially less than would be the case if all the rows which correspond to one slave memory were selected one after the other.

It will be recalled that when SLX is taken into use, a special sub-routine is used for the control of MAS. While this is in use all of the rows of MM are selected which correspond to the faulty slave logic's memory. Thus, for example, if SL2/SM2 are faulty, the rows of MM are selected which correspond to SM2 rows in the following order:

SM2/5; SM2/9; SM2/13; . . . SM2/2; SM2/6; . . .

This sub-routine, of course, does not affect the rate at which the slave memory rows are selected.

An alternative which can be used is to replace the memories, either slave or master or both, by, e.g., delay line stores, in which case the access switches are no longer required.

In the system shown, a separate signalling path is used between the subscriber lines or junctions for the signals indicating the conditions of the lines or junctions. This can be avoided by conveying such signals over the speech highways and feeding them to the logic via approach filters or gates.

The interconnection between slave and master memories described above tends for a high degree of reliability for several reasons. One is that the slave logic is never required to perform "conditional" logical operations during the relatively short period of time which elapses between its reading and writing times. The slave logic is merely instructed to insert into the associated slave memory specific information which it receives from the main logic circuit, or to leave the record in the slave memory unchanged, in the present case by re-recording it without change. The changes which have to be made during operation are carried out at the master logic, whose operational rate is slower than that at which a slave logic operates. Thus there is time for any "conditional" logical operations to be performed.

Another reason for the attainment of a high degree of reliability is that, as already described, it is possible when corresponding slave and master memory rows are associated, to check that the slave has not changed its condition due to a fault, and in the event of such a change to initiate operations which will correct that fault.

It is to be understood that the foregoing description of specific examples of this invention is not to be considered as a limitation of its scope.

What we claim is:

1. In a telecommunication exchange system for extending connections between calling and called ones of a plurality of multi-channel lines, a plurality of synchronized time division multiplex systems each serving a different group of said lines, a memory device in each of said multiplex systems and individual thereto, each of said individual memory devices including a separate group of storage devices for each channel of the associated multiplex system and including reading and recording means, means including the said reading and recording means for cyclically reading and recording associated multiplex system line connection information in the associated group of storage devices at a scanning rate equal to the frequency of said multiplex systems, control means common to all said multiplex systems including a common memory device, said common memory device including a separate group of common storage devices for each channel of each of said systems and including common reading and recording means, and means including the common reading and recording means for cyclically reading and recording line connection information for all of said multiplex systems in the said groups of common storage devices at a scanning rate which is a submultiple of the said multiplex system frequency.

2. A telecommunication exchange system as claimed in claim 1, and means for reading the said information relating to a connection from said common memory, and before means for reading information relating to the same connection from the corresponding individual memory in sequence.

3. A telecommunication exchange system as claimed in claim 1 and means including said individual memory reading and recording means for automatically reading and re-recording information relating to a connection during each scanning cycle, and said common control equipment includes means responsive to information read from said common memory for indicating that the information in said individual memory and relating to said connection is to be changed, and means responsive to indicating means for recording in the individual memory information read from the common memory in place of the information read from the individual memory.

4. A telecommunication exchange system as claimed in claim 1 and means for recording information relating to a connection in said common memory after information relating to the same connection is recorded in the corresponding individual memory.

5. A telecommunication exchange system as claimed in claim 1 said sub-multiple being one-quarter of the frequency of said time division multiplex systems whereby said individual memory reading and recording means scans four groups of storage devices for every group of storage devices scanned by said common memory reading and recording means.

6. A telecommunication exchange system as claimed in claim 1 wherein the number of groups of storage areas in said common memory is equal to the sum of the number of channels in said time division multiplex systems, wherein each group of storage devices in said common memory is individually allocated to a channel in a time division multiplex system, and wherein the groups of storage devices in said common memory are so arranged that the common memory reading and recording means is consecutively associated with a group of storage devices in each time division multiplex system in turn.

7. A telecommunication exchange system as claimed in claim 1 wherein said common control means includes error checking means for detecting an error in information read from said common memory, and, in the event of an error being detected, for initiating recording in the common memory of information read from the corresponding individual memory in place of the erroneous information.

8. A telecommunication exchange system as claimed in claim 1 wherein each of said individual memories includes error checking means for detecting an error in information read from an individual memory, a spare individual memory and means, in response to an error being detected, for substituting said spare memory in place of the faulty memory and means for recording in the said slave memory corresponding information read from the common memory device.

9. A telecommunication exchange system as claimed in claim 8 wherein the recording in said spare memory is carried out in a time interval during the scanning cycle of said common memory reading and recording means which is allocated for this purpose.

10. A telecommunication exchange system as claimed in claim 1 wherein said common memory and said individual memories each comprise a matrix of ferromagnetic storage devices.

11. A telecommunication exchange system as claimed in claim 5, and processing means for reading information relating to a line connection from the said common memory during a first time interval, means whereby the information relating to the same line connection is read from the corresponding individual memory and selected ones of the said information read from the individual and common memories is recorded in the last-said individual memory during a second time interval, means whereby the said information read during the said first time interval is processed by said processing means during a third time interval, and means whereby the said processed information is recorded in said common memory during a fourth time interval.

References Cited in the file of this patent

UNITED STATES PATENTS

| | | |
|---|---|---|
| 2,725,470 | Houghton | Nov. 29, 1955 |
| 2,870,429 | Hales | Jan. 20, 1959 |
| 2,910,540 | Van Mierlo et al. | Oct. 27, 1959 |
| 2,932,013 | Sager et al. | Apr. 5, 1960 |
| 2,984,705 | Harris | May 16, 1961 |